US012643413B2

(12) United States Patent
Oh et al.

(10) Patent No.: US 12,643,413 B2
(45) Date of Patent: Jun. 2, 2026

(54) METHOD OF CONTROLLING TORQUE OF DRIVE SYSTEM OF ELECTRIC VEHICLE

(71) Applicants: Hyundai Motor Company, Seoul (KR); Kia Corporation, Seoul (KR)

(72) Inventors: Ji Won Oh, Hwaseong-Si (KR); Jeong Soo Eo, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 249 days.

(21) Appl. No.: 18/221,232

(22) Filed: Jul. 12, 2023

(65) Prior Publication Data

US 2024/0317067 A1     Sep. 26, 2024

(30) Foreign Application Priority Data

Mar. 22, 2023     (KR) ........................ 10-2023-0037018

(51) Int. Cl.
*G06F 17/00*          (2019.01)
*B60K 23/08*          (2006.01)
(Continued)

(52) U.S. Cl.
CPC .......... *B60L 15/20* (2013.01); *B60K 23/0808* (2013.01); *B60L 7/10* (2013.01); *B60L 2240/12* (2013.01); *B60L 2240/463* (2013.01); *B60L 2250/28* (2013.01); *B60L 2260/20* (2013.01); *B60L 2260/24* (2013.01)

(58) Field of Classification Search
CPC ........ B60L 15/20; B60L 7/10; B60L 2240/12; B60L 2240/463; B60L 2250/28; B60L 2260/20; B60L 2260/24; B60L 2240/423; B60L 7/18; B60L 7/26; B60L 15/2009; B60L 7/02; B60L 2220/46;
(Continued)

(56) References Cited

U.S. PATENT DOCUMENTS 9,283,936 B2 * 3/2016 Akaho .................... B60T 11/04
10,099,694 B2 * 10/2018 Takahashi .............. B60K 6/445
(Continued)

FOREIGN PATENT DOCUMENTS

JP       2008-024022 A       2/2008
JP       2008-167612 A       7/2008
(Continued)

OTHER PUBLICATIONS

Regenerative Braking Strategy of Dual-Motor EV Considering Energy Recovery and Brake Stability (Year: 2023).*
(Continued)

*Primary Examiner* — Ronnie M Mancho
(74) *Attorney, Agent, or Firm* — MORGAN, LEWIS & BOCKIUS LLP

(57)          ABSTRACT

A method of controlling torque of a drive system of an electric vehicle includes determining, by a controller, required torque according to a vehicle driving state while the vehicle is driven, and determining a total torque command based on the determined required torque, and performing, by the controller, a front wheel and rear wheel torque distribution process on the total torque command, so that a front wheel torque command and a rear wheel torque command following the total torque command are determined.

18 Claims, 8 Drawing Sheets

(51) Int. Cl.
    B60L 7/10          (2006.01)
    B60L 15/20       (2006.01)

(58) Field of Classification Search
    CPC ............. B60L 2250/26; B60L 2270/14; B60K
               23/0808; B60Y 2200/91; B60Y 2306/09
    USPC ......................................................... 701/22
    See application file for complete search history.

(56) References Cited

U.S. PATENT DOCUMENTS

| | | | | |
|---|---|---|---|---|
| 10,814,727 | B2 * | 10/2020 | Zhao | B60L 15/2009 |
| 10,972,020 | B2 * | 4/2021 | Sawada | H02P 5/52 |
| 11,021,077 | B2 * | 6/2021 | Oyama | B60L 50/66 |
| 11,040,709 | B2 * | 6/2021 | Fukushiro | B60W 30/18127 |
| 11,794,744 | B2 * | 10/2023 | Hancock | B60W 30/18072 |
| 11,815,175 | B2 * | 11/2023 | Kawasaki | B60K 20/02 |
| 12,065,041 | B2 * | 8/2024 | Tsukizaki | B60L 7/10 |
| 12,246,697 | B2 * | 3/2025 | Adcock | B60W 10/06 |
| 2017/0028871 | A1 * | 2/2017 | Fukudome | B60T 1/10 |
| 2017/0334432 | A1 | 11/2017 | Kawai et al. | |
| 2018/0162365 | A1 | 6/2018 | Kim et al. | |
| 2019/0217709 | A1 * | 7/2019 | Zhao | B60T 8/172 |
| 2019/0299807 | A1 * | 10/2019 | Oyama | B60K 23/08 |
| 2020/0292062 | A1 * | 9/2020 | Kawasaki | B60W 10/18 |
| 2020/0385001 | A1 * | 12/2020 | Hancock | B60L 50/60 |
| 2022/0135021 | A1 | 5/2022 | Furuta et al. | |
| 2023/0166715 | A1 * | 6/2023 | Adcock | B60K 6/485 |
| | | | | 701/22 |
| 2023/0241983 | A1 * | 8/2023 | Ravichandran | B60L 15/2045 |
| | | | | 701/22 |
| 2023/0373295 | A1 * | 11/2023 | Yamazaki | B60L 7/26 |
| 2024/0116371 | A1 * | 4/2024 | Ravichandran | F16H 57/12 |
| 2024/0239207 | A1 * | 7/2024 | Tsukizaki | B60L 15/20 |
| 2024/0317050 | A1 * | 9/2024 | Oh | B60T 1/062 |
| 2024/0317067 | A1 * | 9/2024 | Oh | B60L 7/26 |
| 2025/0018805 | A1 * | 1/2025 | Oh | B60K 1/02 |
| 2025/0058644 | A1 * | 2/2025 | Oh | B60L 7/18 |

FOREIGN PATENT DOCUMENTS

| | | |
|---|---|---|
| JP | 2017-105442 A | 6/2017 |
| JP | 2018-095246 A | 6/2018 |
| KR | 10-1448746 B | 10/2014 |
| KR | 10-1704243 B | 2/2017 |
| KR | 2022-0096746 A | 7/2022 |

OTHER PUBLICATIONS

Regenerative Braking Strategy of Dual-Motor EV Considering Energy Recovery and Brake Stability (Year: 2023) (Year: 2023).*

* cited by examiner

BACKLASH

SLACK

[ NORMAL MODE : BACKLASH BAND EVASION MODE OFF ]

[ BACKLASH BAND EVASION MODE ON ]

FIG. 6

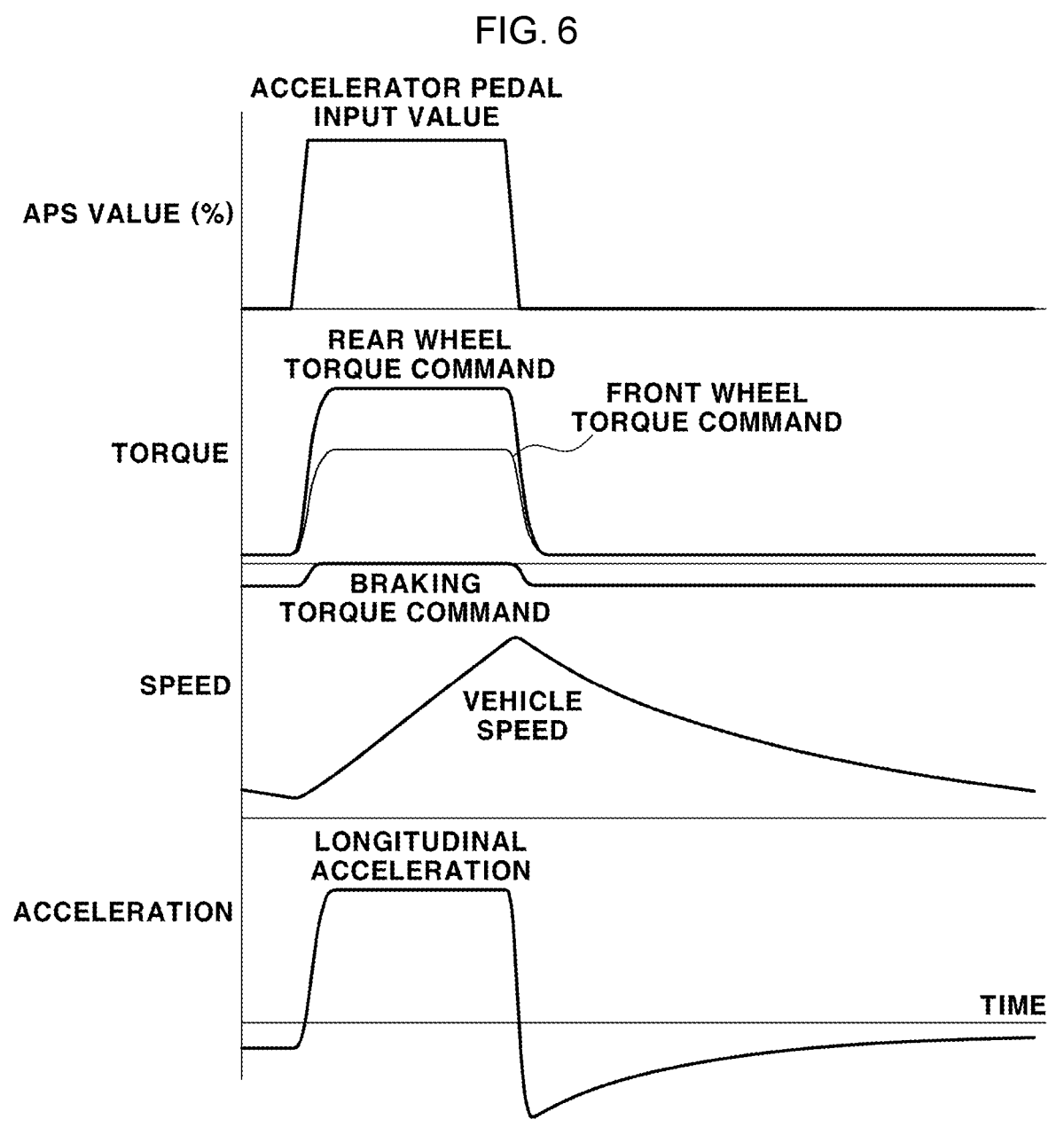

ACCELERATOR PEDAL
INPUT VALUE

APS VALUE (%)

REAR WHEEL
TORQUE COMMAND

FRONT WHEEL
TORQUE COMMAND

TORQUE

BRAKING
TORQUE COMMAND

SPEED

VEHICLE
SPEED

LONGITUDINAL
ACCELERATION

ACCELERATION

TIME

[ COASTING DECELERATION PROFILING ]

METHOD OF CONTROLLING TORQUE OF DRIVE SYSTEM OF ELECTRIC VEHICLE

CROSS-REFERENCE TO RELATED APPLICATION

The present application claims priority to Korean Patent Application No. 10-2023-0037018 filed on Mar. 22, 2023, the entire contents of which is incorporated herein for all purposes by this reference.

BACKGROUND OF THE PRESENT DISCLOSURE

Field of the Present Disclosure

The present disclosure relates to a method of controlling torque of a drive system of an electric vehicle. More particularly, it relates to a torque control method capable of generating torque by evading a backlash band of a drive system in an electric vehicle.

Description of Related Art

In general, the drive system of a vehicle needs to generate appropriate torque according to a torque command determined by a driving input value of a driver (for example, an accelerator pedal input value, a brake pedal input value, etc.) or a request of an advanced driver assistance system (ADAS).

At the present time, when a torque change rate is set to be excessively high, there may be problems such as driveshaft torsion, gear backlash hit, or impulsive drivability deterioration due to rapidly changing torque.

Conversely, when the torque change rate is excessively small, it takes excessive time for the driver or an ADAS controller to provide required torque, and actual behavior of the vehicle differs from intention of the driver, causing frustrating responsiveness or dangerous situations.

Accordingly, there is a trade-off between a degree of reduction in Noise, Vibration, and Harshness (NVH) in the vehicle due to rapid torque change and a degree of ensuring acceleration/deceleration responsiveness of the vehicle.

In current mass-produced vehicles, slope limiting and filters using various conditions as factors are used to generate optimal torque commands capable of solving such trade-off.

Furthermore, in an electrified vehicle using a motor as a driving source or a portion thereof, active feedback torque compensation control capable of suppressing vibration that has previously occurred using a motor may be applied.

However, even when advanced backlash post-correction control is applied, it is difficult to suppress a problem of deterioration in vehicle responsiveness, which inevitably occurs chronically due to characteristics of hardware. Moreover, NVH issues due to backlash frequently occur in an electric vehicle having few vibration damping elements in a drive system.

Generally, there is a method of generating a model speed of a driveshaft using a disturbance observer and reducing vibration using a deviation between the model speed and an actual speed of the driveshaft. The patent document also includes a method of calculating a model speed based on a wheel speed instead of the disturbance observer in determining the model speed.

Furthermore, generally there is a method of generating a model speed of a motor using an input torque model and reducing vibration using a deviation between the model speed and an actual speed of the motor.

Furthermore, generally there is a method of estimating a speed of a drive system using a torque model and determining a slope of a torque command using a difference between an actual speed and the estimated speed of the drive system.

However, all of the above conventional technologies only suggest a torque compensation method for reducing and suppressing vibration generated in a drive system, and fail to suggest a torque determination method capable of preventing occurrence of vibration itself in advance.

Therefore, in relation to the backlash of the drive system, there is a demand for a control method capable of generating a torque command by evading a backlash band in which backlash of the drive system may occur, rather than a control method that alleviates a problem caused by the backlash.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a torque command generation and torque control method for a drive system of an electric vehicle configured for generating torque by evading a backlash band to prevent backlash from occurring in the drive system.

The object of the present disclosure is not limited to the object mentioned above, and other objects not mentioned herein may be clearly understood by those of ordinary skill in the art to which an exemplary embodiment of the present disclosure belongs (hereinafter referred to as "person of ordinary skill") from the description below.

Various aspects of the present disclosure are directed to providing a method of controlling torque of a drive system of an electric vehicle, the method including determining, by a controller, required torque according to a vehicle driving state while the vehicle is driven, and determining a total torque command based on the determined required torque, and performing, by the controller, a front wheel and rear wheel torque distribution process on the total torque command, so that a front wheel torque command for controlling an operation of a front wheel motor and a rear wheel torque command for controlling an operation of a rear wheel motor are determined, wherein, during coasting deceleration driving of the vehicle, each of the front wheel torque command and the rear wheel torque command is determined as a value greater than or equal to a minimum torque threshold value determined as a positive (+) torque value, and a braking torque command for a friction braking device is generated by the controller so that the vehicle decelerates, and friction braking torque by the friction braking device is applied to wheels of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

The above and other features of the present disclosure are discussed infra.

BRIEF DESCRIPTION OF THE DRAWINGS

FIG. 6 is a diagram illustrating another example of a front wheel and rear wheel torque distribution state in an exemplary embodiment of the present disclosure.

Figure 1:
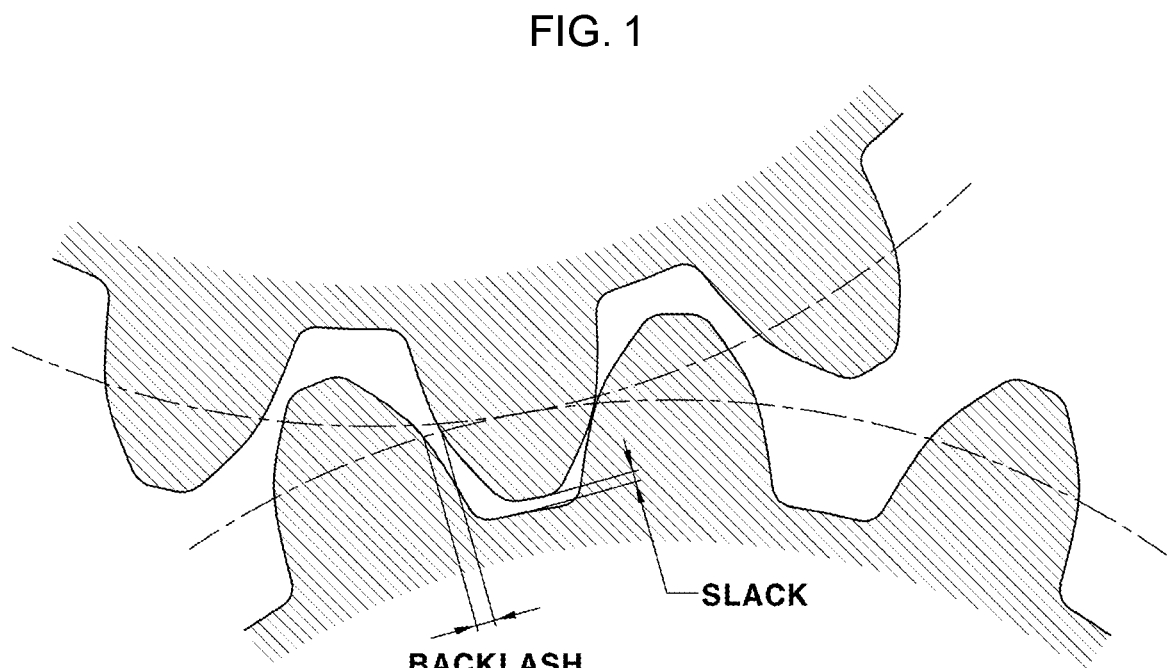
FIG. 1 is a diagram illustrating backlash.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings. Specific structural or functional descriptions presented in the exemplary embodiments of the present disclosure are only illustrative for describing embodiments according to the concept of the present disclosure, and the exemplary embodiments according to the concept of the present disclosure may be implemented in various forms. Furthermore, the present disclosure should not be construed as being limited to the exemplary embodiments described herein, and should be understood to include all modifications, equivalents, and substitutes included in the spirit and scope of the present disclosure.

Meanwhile, in an exemplary embodiment of the present disclosure, even though terms such as "first", "second", etc. may be used to describe various elements, the elements are not limited by these terms. These terms are only used to distinguish one element from another. For example, within the scope not departing from the scope of the rights according to the concept of the present disclosure, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions for describing a relationship between elements, that is, expressions such as "between" and "immediately between" or "adjacent to" and "directly adjacent to", should be interpreted similarly.

Like reference numerals refer to like elements throughout. The terminology used herein is for describing the embodiments, and is not intended to limit the present disclosure. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

Various embodiments of the present disclosure relates to a method of controlling torque of a drive system of an electric vehicle, and relates to a torque command generation and torque control method configured for generating a torque command by evading a backlash band in which backlash may occur so that occurrence of backlash in the drive system may be prevented rather than a control method for mitigating a problem caused by backlash in the drive system.

In an exemplary embodiment of the present disclosure, a backlash band may be defined as a torque region in which backlash may occur in a drive system of a vehicle. Here, the drive system of the vehicle includes drive elements such as a driveshaft between a drive device and drive wheels, a reducer, a differential, and an axle in addition to the drive device and the drive wheels for driving the vehicle.

In an exemplary embodiment of the present disclosure, "torque" encompasses both driving torque for accelerating the vehicle and braking torque for decelerating the vehicle. Herein, "braking torque" (deceleration torque) encompasses regenerative braking torque by a motor and friction braking torque by a friction braking device.

However, when a front wheel torque command and a rear wheel torque command indicate negative (−) values, the front wheel torque command and the rear wheel torque command indicating negative values refer to regenerative torque commands, and in FIGS. 4B to 7 described later, a "braking torque command" refers to a friction braking torque command.

Unless otherwise specified in the present specification as being divided into driving torque and braking torque, torque may be a driving torque for accelerating the vehicle (acceleration situation) or a braking torque for decelerating the vehicle (deceleration situation) depending on the driving situation of the vehicle.

In an exemplary embodiment of the present disclosure, the driving torque and a driving torque command each include a torque value for accelerating the vehicle, which is defined as a positive (+) torque value. On the other hand, the braking torque and the braking torque command each include a torque value for decelerating the vehicle, which is defined as a negative (−) torque value.

As described above, when the vehicle is driving, positive (+) torque, which is forward torque, or negative (−) torque, which is reverse torque, is applied to the drive system depending on whether the vehicle is accelerating or decelerating, and a direction of the torque applied from the motor to the drive system and transmitted through the drive system may change depending on the driving situation of the vehicle.

The present disclosure has been generated based on the principle that a problem caused by backlash in the drive system of the vehicle mainly occur only in a torque region close to 0, and the torque region close to 0 may be referred to as a backlash band where a backlash problem may occur.

In an exemplary embodiment of the present disclosure, the backlash band includes a backlash band of a front wheel drive system, which is a torque region in which backlash may occur in the front wheel drive system, and a backlash band of a rear wheel drive system, which is a torque region in which backlash may occur in the rear wheel drive system.

In an exemplary embodiment of the present disclosure, the backlash band of the front wheel drive system and the backlash band of the rear wheel drive system may be set to a torque range bordering a lower threshold value, which is a negative (−) value, and an upper limit threshold value, which is a positive value (+).

That is, the backlash band may be set to a torque range including 0, and a backlash state may occur when input torque applied from the motor, which is the drive device, to the drive system enters the set backlash band.

Backlash is a tolerance that exists between meshing teeth of two gears as illustrated in FIG. 1. Between two meshed gears, vibration or noise may occur as gear teeth strike each other due to backlash, and in the worst case, backlash may cause gear damage.

When torque is continuously applied in one direction, one of the two meshed gears continues to transmit force to the other in the same direction. Thus, the teeth of the two meshed gears are aligned and meshed in a forward direction, and at the instant time, a problem due to backlash tolerance does not occur.

However, when the direction of the torque is changed, the teeth of the gear reversely align after experiencing a backlash tolerance as a direction of force transmission is reversed. At the instant time, after alignment in the reverse direction is performed, while the force in the same direction is continuously transmitted, meshing of the gears is not released again, and thus a problem due to backlash does not occur.

However, at the moment when the direction of the transmitted force is changed again, a problem due to backlash occurs when meshing between the teeth of the two gears is released and then meshing is performed again while passing the meshing tolerance.

Therefore, a core of a method for not causing the backlash problem is to eliminate or minimize a situation of releasing gear engagement, which may be achieved by eliminating or minimizing a direction change of a torque command with respect to the drive device such as the motor.

Figure 2:
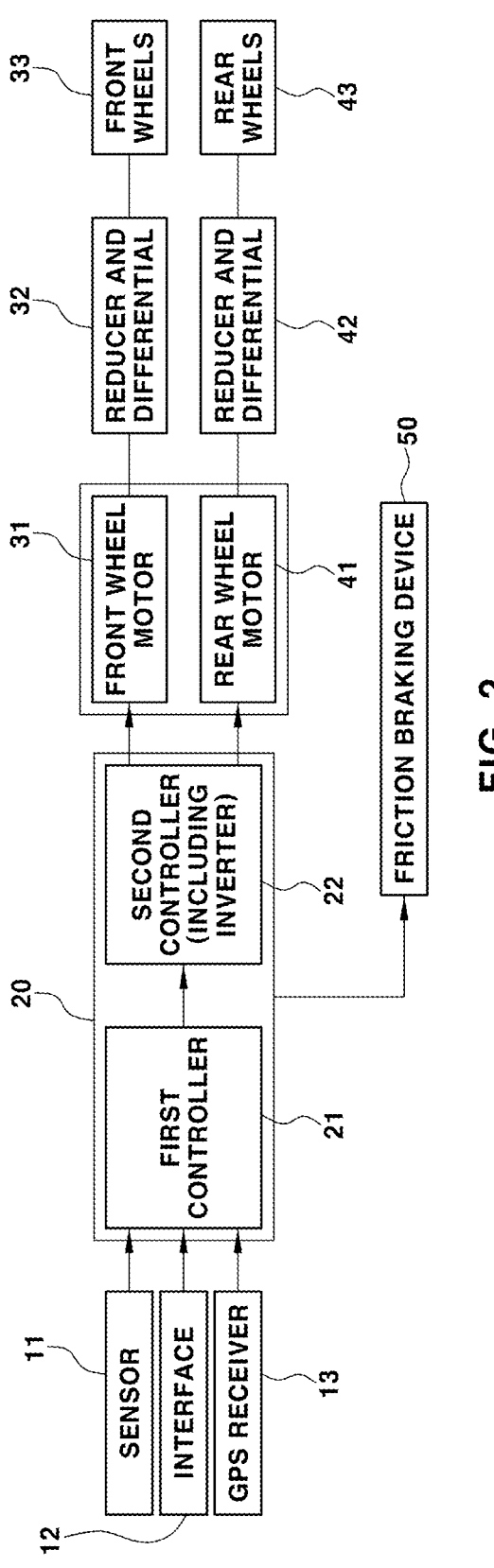
FIG. 2 is a block diagram illustrating a configuration of a device for performing a drive system torque control process according to various exemplary embodiments of the present disclosure.
Figure 3:
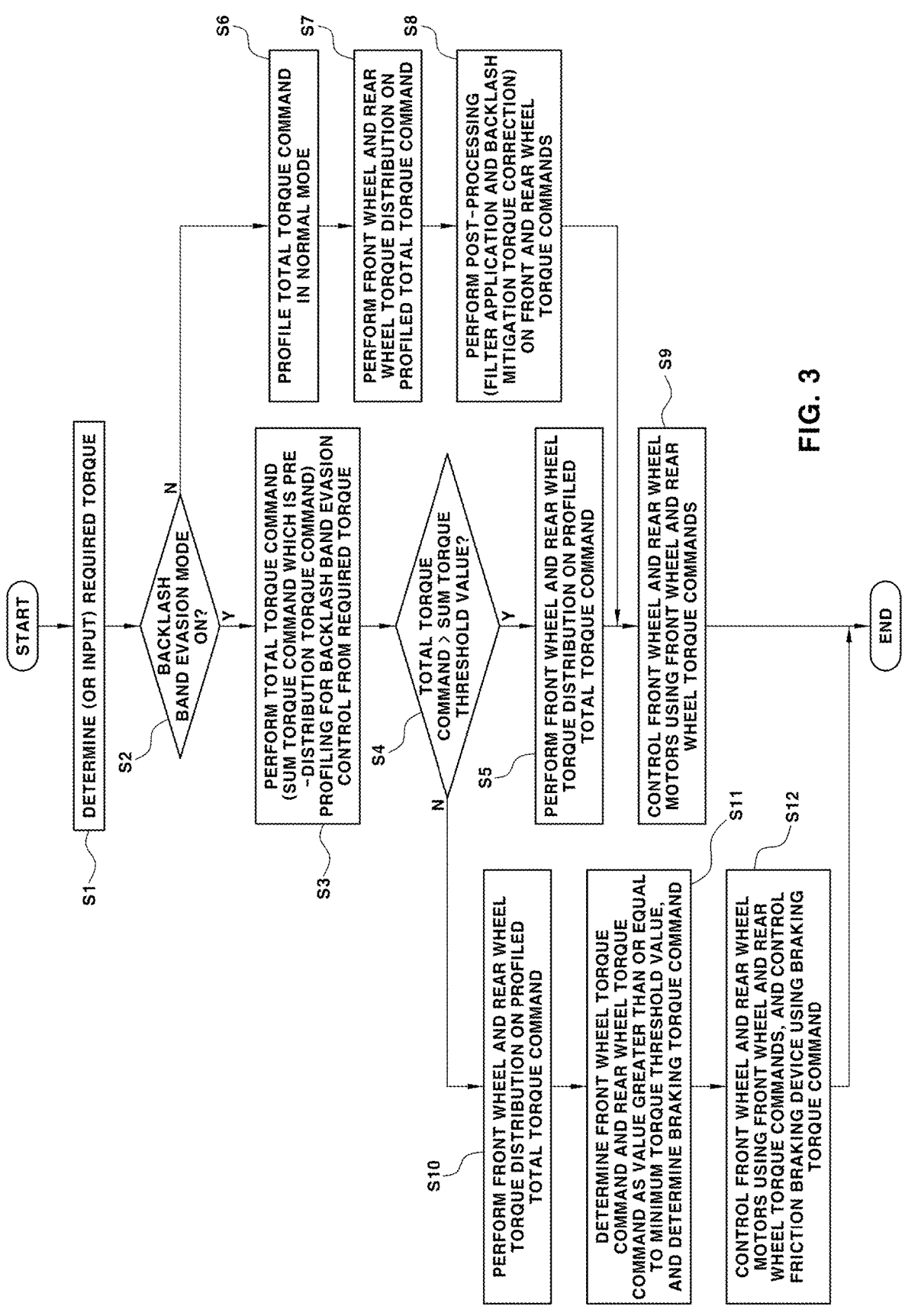
FIG. 3 is a flowchart illustrating the drive system torque control process according to various exemplary embodiments of the present disclosure.

FIG. 2 is a block diagram illustrating a configuration of a device for performing a drive system torque control process according to various exemplary embodiments of the present disclosure, and FIG. 3 is a flowchart illustrating the drive system torque control process according to various exemplary embodiments of the present disclosure.

The present disclosure may be applied to a vehicle provided with a plurality of drive devices, and may be applied to a vehicle in which front wheels 33 and rear wheels 43 are driven by independent drive devices, respectively. Furthermore, the present disclosure may be applied to an electric vehicle that runs using motors 31 and 41 as the drive devices.

The present disclosure may be applied to a vehicle provided with a front wheel drive device for applying torque to the front wheels 33 and a rear wheel drive device for applying torque to the rear wheels 43. Furthermore, the present disclosure may be applied to a vehicle in which both the front wheel drive device and the rear wheel drive device are motors. In the following description, the motor 31 driving the front wheels 33 will be referred to as a "front wheel motor" and the motor 41 driving the rear wheels 43 will be referred to as a "rear wheel motor".

Referring to FIG. 2, the front wheel motor 31 and the rear wheel motor 41 are illustrated as drive devices of the electric vehicle. The front wheel motor 31 and the rear wheel motor 41 are connected to the front wheels 33 and the rear wheels 43 provided as drive wheels through drive system elements such as reducers, differentials 32 and 42, and axles, respectively, so that power may be transmitted.

Accordingly, torque output from the front wheel motor 31 and the rear wheel motor 41 may be transmitted to the front wheels 33 and the rear wheels 43 through drive system elements such as the reducers, the differentials 32 and 42, and the axles, respectively.

Furthermore, although not separately illustrated in FIG. 2, a battery is connected to the front wheel motor 31 and the rear wheel motor 41 via an inverter so that the battery may be charged and discharged. The inverter may include a front wheel inverter for driving and controlling the front wheel motor 31 and a rear wheel inverter for driving and controlling the rear wheel motor 41.

In the electric vehicle, operations (driving and regeneration) of the front wheel motor 31 and the rear wheel motor 41 are controlled according to torque commands generated by a controller 20. At the instant time, the controller 20 is configured to determine required torque according to a vehicle driving state to drive the vehicle, and generates a final torque command (total torque command) based on the determined required torque.

Furthermore, the controller 20 is configured to control the operations of the front wheel motor 31 and the rear wheel motor 41 through the inverter according to the final torque command. In the following description, when the torque command is a positive (+) value, the torque command is defined as a driving torque command, and when the torque command is a negative (−) value, the torque command is defined as a regenerative torque command.

Furthermore, the final torque command is a pre-distribution torque command before torque distribution to the front and rear wheels, and in the following description, pre-distribution torque command, sum torque command, and total torque command are used interchangeably.

In an exemplary embodiment of the present disclosure, the controller 20 may include a first controller 21 that is configured to determine required torque based on a driving input value of the driver or receives required torque from another controller such as an ADAS controller, and generates and outputs a final torque command based on the required torque, and a second controller 22 that is configured to control the operations of the front wheel motor 31 and the rear wheel motor 41 according to the final torque command input from the first controller 21.

The first controller 21 may be a vehicle control unit (VCU) that is configured to determine and generates a torque command for controlling an operation of a motor in a typical vehicle. Because a method and process for determining a torque command in a vehicle are well-known technical matters in the field of the present disclosure, a detailed description thereof will be omitted.

Furthermore, the first controller 21 may be configured to determine the front wheel torque command and the rear wheel torque command from the final torque command through a front wheel and rear wheel torque distribution process. Accordingly, when the front wheel torque command and the rear wheel torque command are output from the first controller 21, the second controller 22 receives the front wheel torque command and the rear wheel torque command, and operates the front wheel motor 31 and the rear wheel motor 41 through the front wheel inverter and the rear wheel inverter.

The second controller 22 may be a general motor control unit (MCU) that is configured to control an operation of a driving motor through the inverter according to a torque command output from the VCU in the electric vehicle.

In the above description, a control subject includes the first controller 21 and the second controller 22. However, the torque control process according to an exemplary embodiment of the present disclosure may be performed by one integrated control element instead of a plurality of controllers.

A plurality of controllers and one integrated control element may be collectively referred to as a controller, and the torque control process according to an exemplary embodiment of the present disclosure described below may be performed by the present controller.

In an exemplary embodiment of the present disclosure, vehicle driving information, such as a driving input value of the driver input to the controller 20, is information indicating a vehicle driving state, and may include sensor detection information detected by a sensor 11 and input to the controller 20 through a vehicle network.

At the present time, the sensor 11 for detecting the vehicle driving information may include an accelerator position sensor (APS) for detecting an accelerator pedal input value (APS value, %) of the driver, a brake pedal position sensor (BPS) for detecting a brake pedal input value (BPS value, %) of the driver, a sensor configured for detecting a drive system speed, a sensor configured for detecting a vehicle speed, and a temperature sensor configured for detecting a drive system temperature.

Here, the drive system speed may be a rotation speed of the front wheel motor 31 and the rear wheel motor 41, which are driving motors, or a rotation speed (wheel speed) of the drive wheels 33 and 43. At the instant time, the sensor configured for detecting the drive system speed may be a sensor configured for detecting the rotation speed of each of the motors 31 and 41, which may be a normal resolver for detecting a rotor position of the motor. Alternatively, the sensor configured for detecting the drive system speed may be a wheel speed sensor configured for detecting the rotation speed (wheel speed) of the drive wheels 33 and 43.

Furthermore, the sensor configured for detecting the vehicle speed may also be a wheel speed sensor. Obtaining the vehicle speed information from a signal of the wheel speed sensor is a well-known technical matter in the field of the present disclosure, and thus a detailed description thereof will be omitted.

The accelerator pedal input value (APS value, %) of the driver, the brake pedal input value (BPS value, %) of the driver, the speed (rotation speed) of the drive motors 31 and 41, the vehicle speed, the drive system temperature, etc. may be selectively used as the vehicle driving information for determining and generating the required torque and torque command in the controller 20, which is detected by the sensor 11.

The drive system temperature may be used to determine a minimum torque threshold value as will be described later, and in an exemplary embodiment of the present disclosure, the minimum torque threshold value is used to determine the front wheel torque command and the rear wheel torque command. The drive system temperature may be a drive system oil temperature, and may be a temperature of oil used to cool the front wheel motor 31 and the rear wheel motor 41.

In the vehicle driving information, the accelerator pedal input value and the brake pedal input value, which are pedal input values of the driver, may be referred to as driving input information of the driver, and the speed of the driving motor, the vehicle speed, and the drive system temperature detected by the sensor 11 may be referred to as vehicle state information.

Furthermore, the vehicle driving information may include information independently determined by the controller 20 in a broad sense, and furthermore, may include information (for example, required torque information) input to the controller 20 from another controller (for example, the ADAS controller) in the vehicle through the vehicle network.

In FIG. 2, reference numeral 12 denotes an interface connected to the controller 20 in the vehicle, and the interface 12 may include an input device and an output device. In an exemplary embodiment of the present disclosure, the interface 12 is provided to enable driver operation, input, selection, and display of various information, and may be used to perform an ON/OFF operation of a backlash band evasion mode described later, or provide various user interfaces (UIs).

In an exemplary embodiment of the present disclosure, the input device and the output device of the interface 12 may be selected from known devices so long as the input device and the output device can perform the ON/OFF operation of the backlash band evasion mode, and input or display various information.

For example, the interface 12 may include an operating device such as a button or switch provided in the vehicle, an input device or a display device of an audio, video, navigation (AVN) system, or a touch screen.

In FIG. 2, reference numeral 13 denotes a Global Positioning System (GPS) receiver mounted on the vehicle and connected to the controller 20, and the GPS receiver 13 is provided to receive a GPS signal indicating a current vehicle location from outside the vehicle.

In addition, the GPS receiver 13 is provided to input the received GPS signal to the controller 20. Thus, the controller 20 may decide and determine the current vehicle location in real time from the GPS signal received and input through the GPS receiver 13.

In FIG. 2, reference numeral 50 denotes a friction braking device of the vehicle, which may be a conventional hydraulic braking device that applies braking torque to the wheels, and may be a rear wheel friction braking device that applies friction braking torque to the rear wheels 43 as a more specific example.

Meanwhile, various aspects of the present disclosure are directed to providing a method configured for generating a torque command by evading the backlash band in which backlash in the drive system may occur. Here, evasion of the backlash band means maximally preventing a situation in which the torque command invades the backlash band.

This may be achieved by a method in which all of front wheel torque (which means actual torque), a front wheel torque command, rear wheel torque (which means actual torque), and a rear wheel torque command maintain positive (+) torque values because the backlash issue is characterized by occurring when the direction of torque is changed as mentioned earlier.

Therefore, in an exemplary embodiment of the present disclosure, to solve problems caused by backlash and ensure acceleration/deceleration responsiveness, it is possible to apply a control method of limiting torque generated from all driving sources (for example, a motor, which is the drive device) for driving the vehicle to a preset threshold value or more.

In detail, in an exemplary embodiment of the present disclosure, a total torque command for evading the backlash band is determined from the required torque, and the front wheel torque command and the rear wheel torque command are determined from the total torque command through a front wheel and rear wheel torque distribution process. At the instant time, both the front wheel torque command and the rear wheel torque command are determined as values equal to or greater than a minimum torque threshold value predetermined as a positive (+) torque value.

Furthermore, in an exemplary embodiment of the present disclosure, the minimum torque threshold value for backlash band evasion control includes a minimum torque threshold value for the front wheel torque command and a minimum torque threshold value for the rear wheel torque command.

In the following description, "front wheel minimum torque threshold value" refers to a minimum torque threshold value for the front wheel torque command (for the front wheel motor and the front wheel drive system), and "minimum rear wheel torque threshold value" refers to a minimum torque threshold value for the rear wheel torque command (for the rear wheel motor and the rear wheel drive system).

Furthermore, in the following description, without distinction between the front wheels and the rear wheels, "minimum torque threshold value" collectively refers to the minimum front wheel torque threshold value and the minimum rear wheel torque threshold value.

In an exemplary embodiment of the present disclosure, the minimum front wheel torque threshold value and the minimum rear wheel torque threshold value are configured to maintain and control the torque of the front wheel motor 31 and the rear wheel motor 41 at positive (+) torque values. The two threshold values are both set to positive (+) torque values, and the two threshold values may be set to the same value or different values.

In an exemplary embodiment of the present disclosure, gears are continuously aligned in a positive (+) torque transmission direction so that torque does not enter the backlash band in both the front wheel drive system and the rear wheel drive system, which may be achieved by continuously generating at least a small amount of positive (+) directional torque.

To the present end, when the backlash band evasion mode is in an ON state, the front wheel torque command and the rear wheel torque command are maintained at the minimum torque threshold value or more, which is a positive (+) torque value, so that each of input torque applied to the front wheel drive system and input torque applied to the rear wheel drive system by the front wheel motor 31 and the rear wheel motor 41, respectively, maintains a positive (+) torque value.

In an exemplary embodiment of the present disclosure, the minimum rear wheel torque threshold value may be set in the controller 20 as a torque value outside the backlash band, which is a torque region in which backlash may occur in the rear wheel drive system. That is, the minimum rear wheel torque threshold value may be set to a value greater than an upper limit threshold value of the backlash band of the rear wheel drive system.

Similarly, the maximum front wheel torque threshold value may be set in the controller 20 as a torque value outside the backlash band, which is a torque region where backlash may occur in a front wheel drive system. At the instant time, the maximum front wheel torque threshold value may be set in the controller 20 to a value greater than an upper limit threshold value of the backlash band of the front wheel drive system.

Figure 4A:
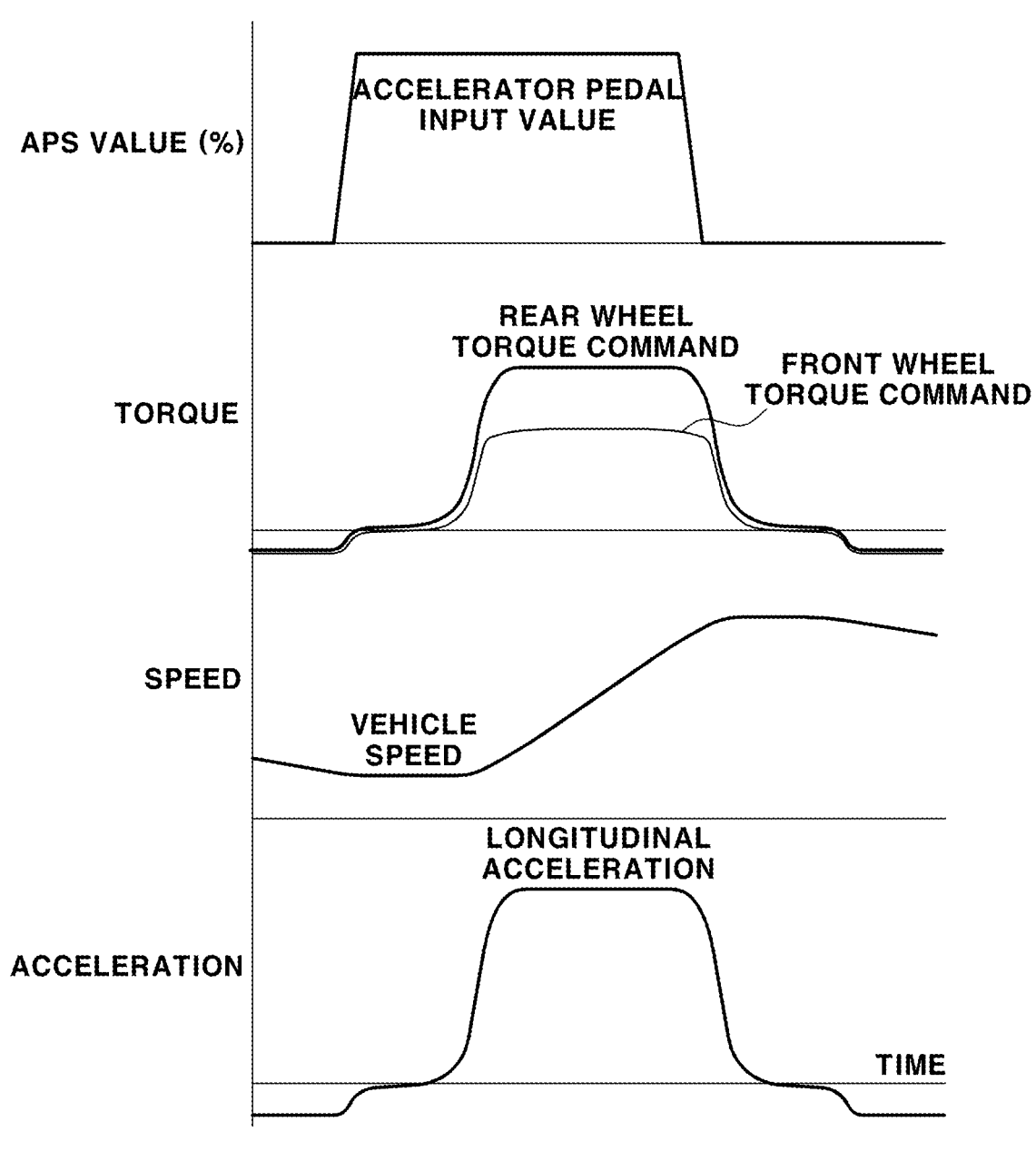
FIG. 4A is a diagram illustrating a distribution state of a front wheel torque command and a rear wheel torque command during acceleration in a normal mode in which a backlash band evasion mode is turned off in an exemplary embodiment of the present disclosure.
Figure 4B:
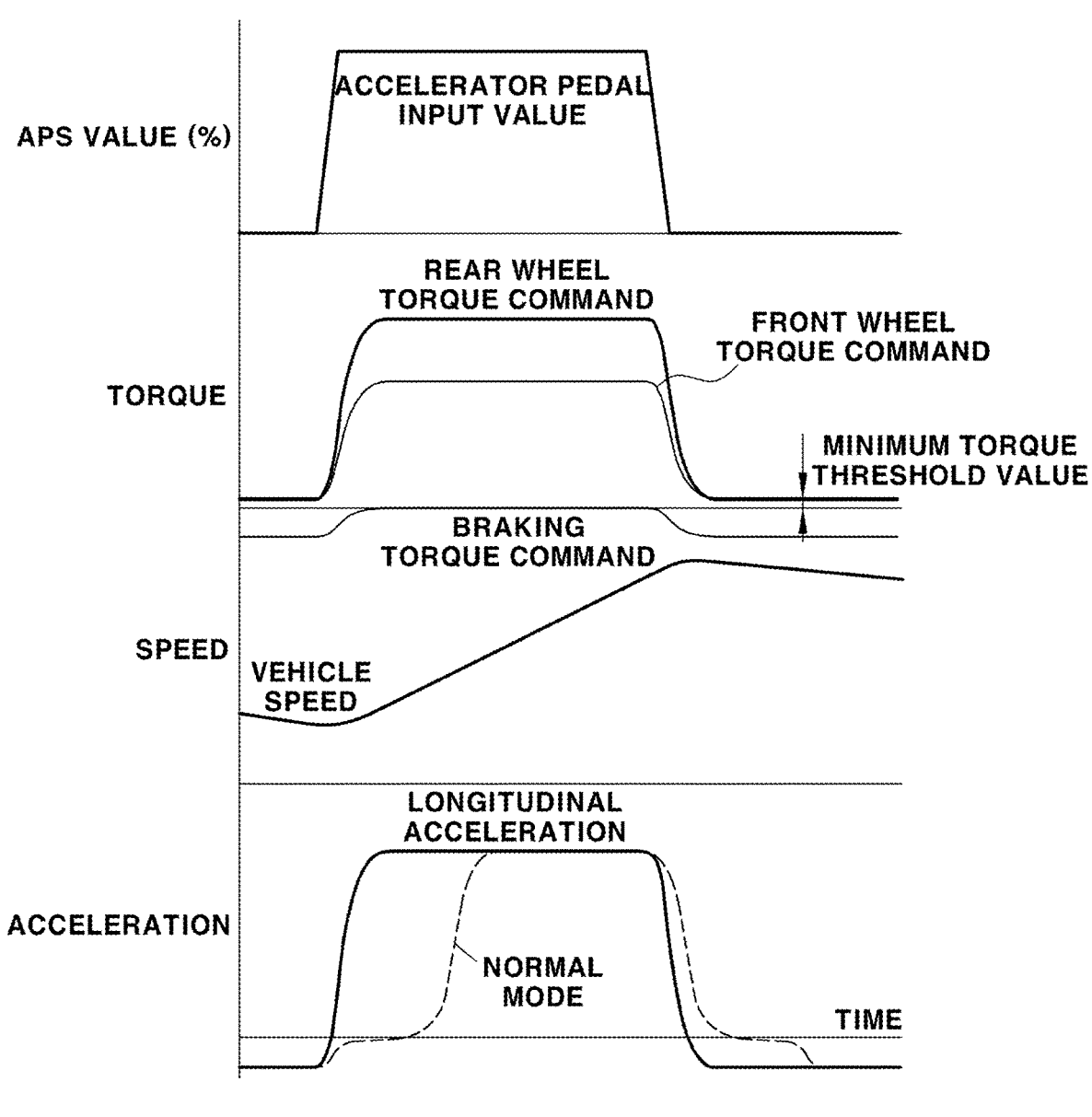
FIG. 4B is a diagram illustrating a control state when the backlash band evasion mode is turned on according to various exemplary embodiments of the present disclosure.

FIG. 4A and FIG. 4B illustrate a front wheel and rear wheel torque distribution state and a front wheel and rear wheel torque command determination method when the backlash band evasion mode is turned off and when the backlash band evasion mode is turned on, respectively, when the controller 20 detects the accelerator pedal input value.

In an exemplary embodiment of the present disclosure, the normal mode may be selected when the driver turns off the backlash band evasion mode through the interface 12, or may be selected when the backlash band evasion control is canceled according to the vehicle driving state or driving mode. The normal mode has no difference compared to the conventional torque control mode, and may be a mode in which known torque control is performed.

The backlash band evasion mode may be selected when the driver inputs an ON state through the interface 12 or when execution of backlash band evasion control is required according to the vehicle driving state or driving mode.

The controller 20 is configured to determine the required torque by itself or receives the requested torque from another controller (step S1 in FIG. 3) as in the case of normal drive system torque control, and verifies whether the backlash band evasion mode is turned off by the driver (step S2 in FIG. 3).

At the present time, when the backlash band evasion mode is turned off, the controller 20 profiles the total torque command in the normal mode (step S6 in FIG. 3).

In an exemplary embodiment of the present disclosure, profiling the total torque command (sum torque command and pre-distribution torque command) and determining a final total torque command based on the vehicle driving information or the required torque may be understood as having the same meaning.

Hereinafter, in the description of the present disclosure, the sum torque command means a total torque command, which is the pre-distribution torque command, and means the torque command obtained by summing both the front wheel torque command and the rear wheel torque command (command including the summed torque value, during acceleration), or means a torque command obtained by summing the front wheel torque command, the rear wheel torque command, and the braking torque command (during coasting deceleration) as will be described later. In an exemplary embodiment of the present disclosure, a torque command for each wheel and a torque command for each axle refer to the front wheel torque command and the rear wheel torque command.

Furthermore, in the description of the present disclosure, invasion or entry into the backlash band means when the torque value of the corresponding torque command becomes a torque value within the backlash band, and passing through the backlash band means that the torque value of the torque command invades the backlash band outside the backlash band and then continuously increases or decreases, thus escaping the backlash band again.

The normal mode is a mode determined and operated in all torque ranges of positive (+) and negative (−) values according to the sum torque command, which is the pre-distribution torque command, to satisfy the required torque by the torque applied by the front wheel motor 31 and the rear wheel motor 41.

For example, in the normal mode in which the backlash band evasion mode is turned off, when there is no input of the accelerator pedal by the driver, that is, in a vehicle deceleration section in which the driver does not depress the accelerator pedal, both the front wheel torque command and the rear wheel torque command may be determined as negative (−) torque values.

Accordingly, when the driver depresses the accelerator pedal to accelerate the vehicle, both the front wheel torque command and the rear wheel torque command in the normal mode are switched from negative (−) torque values to positive (+) torque values. When a torque direction is changed in the present way, each of the front wheel torque command and the rear wheel torque command inevitably passes through the backlash band.

While passing through the backlash band in the present way, even when the driver depresses the accelerator pedal, the direction of the torque applied from the motor to the drive system is not rapidly changed so that the backlash problem may be minimized.

That is, as may be seen in FIG. 4A, the front wheel torque command and the rear wheel torque command are not switched from negative (−) torque to positive (+) torque immediately after the driver depresses the accelerator pedal, and the front wheel torque command and the rear wheel torque command are determined so that the torque applied to the drive system by the motor may change direction while passing through the backlash band for a predetermined time period after the accelerator pedal is depressed (step S7 in FIG. 3).

During a time when the backlash band is passed through as described above, torque slope control is performed to limit slopes of the front wheel torque command and the rear wheel torque command, so that the torque command is not rapidly increased. Backlash control is performed so that a gentle torque change is made in the backlash band for each of the front wheel torque command and the rear wheel torque command.

To the present end, a maximum permissible change rate in the backlash band for the front wheel torque command and the rear wheel torque command is set in the controller 20 to a small value that does not cause backlash impact.

Accordingly, while the front wheel torque command and the rear wheel torque command increase and pass through the backlash band, the front wheel torque command and the rear wheel torque command are determined in the controller 20 to values that gradually change according to the maximum permissible rate of change of the small value.

Furthermore, the front wheel torque command and the rear wheel torque command after passing through the backlash band are determined to have sizes allowing driving torque required for acceleration to be satisfied through the front wheel and rear wheel torque distribution process (step S7 in FIG. 3).

As described above, in normal mode, when the driver depresses the accelerator pedal to accelerate, both the front wheel torque command and the rear wheel torque command are switched from negative (−) torque values to positive (+) torque values, and when the torque direction is changed, both the front wheel torque command and the rear wheel torque command pass through the backlash band.

In the normal mode, backlash control is performed to limit the slope to a maximum permissible rate of change for both the front wheel torque command and the rear wheel torque command to minimize the problem caused by backlash, and thus acceleration delay of the vehicle inevitably occurs in the backlash band.

Furthermore, when the driver tips out the accelerator pedal while depressing the accelerator pedal, both the front wheel torque command and the rear wheel torque command in the normal mode are switched from positive (+) torque values to negative (−) torque values. Accordingly, even when the torque direction is reversely switched, each of the front wheel torque command and the rear wheel torque command inevitably passes through the backlash band.

Even though regenerative torque is required for coasting deceleration driving after tip-out of the accelerator pedal, the direction of torque applied from the motor to the drive system is not rapidly changed while passing through the backlash band so that the backlash problem may be minimized.

That is, as may be seen in FIG. 4A, the front wheel torque command and the rear wheel torque command are not switched from positive (+) torque to negative (−) torque immediately after the driver tips out the accelerator pedal, and the front wheel torque command and the rear wheel torque command are determined so that the torque applied to the drive system by the motor may change direction while passing through the backlash band for a predetermined time period after tip-out of the accelerator pedal (step S7 in FIG. 3).

In the present way, during a time when passing through the backlash band, torque slope control is performed to limit the slopes of the front wheel torque command and the rear wheel torque command, so that the torque commands are not rapidly decreased.

Backlash control is performed so that torque gradually changes in the backlash band for both the front wheel torque command and the rear wheel torque command. At the instant time, in the controller 20, the front wheel torque command and the rear wheel torque command are determined as values that gradually change according to the maximum permissible rate of change of the small value.

Furthermore, after passing through the backlash band, the controller 20 is configured to perform front wheel and rear wheel torque distribution so that regenerative torque required for coasting deceleration driving may be satisfied (step S7 in FIG. 3), and the front wheel torque command and the rear wheel torque command which may satisfy the regenerative torque command (pre-distribution torque command), which is the total torque command during coasting deceleration driving, are determined.

As described above, in the normal mode, when the driver tips-out the accelerator pedal and enters a coasting deceleration situation, both the front wheel torque command and the rear wheel torque command are switched from positive (+) torque values to negative (−) torque values, and both the front wheel torque command and the rear wheel torque command pass through the backlash band when the torque direction is switched. Accordingly, during tip-out of the accelerator pedal, deceleration delay is inevitable.

When the front wheel torque command and the rear wheel torque command are determined through the front wheel and rear wheel torque distribution in the normal mode, post-processing is performed on the determined front and rear wheel torque commands (Step S8 in FIG. 3), and a final front wheel torque command and a final rear wheel torque command are determined by applying a filter to the commands and performing backlash mitigation torque correction.

Subsequently, when the final front wheel torque command and the final rear wheel torque command are determined, the controller 20 is configured to control the front wheel motor 31 and the rear wheel motor 41 according to the determined final front wheel torque command and the determined final rear wheel torque command (step S9).

Next, a description will be provided of torque control when the backlash band evasion mode is turned on. First, the required torque is determined by the controller 20 itself, or the required torque is input to the controller 20 by another controller (step S1 in FIG. 3), and the controller 20 verifies whether the backlash band evasion mode is turned on by the driver (step S2 in FIG. 3).

At the present time, when the backlash band evasion mode is turned on, the controller 20 profiles the total torque command to determine the total torque command for the backlash band evasion control (step S3 in FIG. 3).

Furthermore, in an exemplary embodiment of the present disclosure, when the backlash band evasion mode is turned on, a control operation is performed so that a direction of torque output by each of the front wheel motor 31 and the rear wheel motor 41 and delivered through the drive system is continuously maintained as the same direction, particularly a positive (+) direction, without change for the entire range of the required torque regardless of the acceleration and deceleration situation of the vehicle.

At the present time, in the controller 20, the front wheel torque command and the rear wheel torque command are determined as positive (+) torque values at all times. Thus, when the backlash band evasion mode is in an ON state, each of the front wheel motor 31 and the rear wheel motor 41 continuously applies positive (+) torque to the drive system during vehicle driving.

As illustrated in FIG. 4B, when the driver operates the accelerator pedal, and the accelerator pedal input value is detected in the controller 20, the braking torque command at the instant time does not need to be generated and output, and thus becomes a torque value of 0. However, to satisfy the required torque, the front wheel torque command and the rear wheel torque command are determined to satisfy the total torque command only by the sum of the front wheel torque command and the rear wheel torque command.

The front wheel torque command and the rear wheel torque command distributed through the front wheel and rear wheel torque distribution process are determined to satisfy the total torque command, which is the pre-distribution torque command, only by the sum of the two commands.

However, when the driver releases the accelerator pedal and the accelerator pedal is not applied, the torque values of the front wheel torque command and the rear wheel torque command are both determined as minimum torque threshold values (in the example of FIG. 8, the minimum front wheel torque threshold value and the minimum rear wheel torque threshold value are the same value), which are positive (+) torque values.

However, when the accelerator pedal is not applied, the controller 20 implements a coasting deceleration function by generating a braking torque command for applying friction braking torque to the wheels of the vehicle.

At the present time, a difference between the total torque command, which is the pre-distribution torque command, and the sum of the front wheel torque command and the rear wheel torque command determined as the minimum torque threshold values, respectively, is determined in the controller 20 as a torque value of the braking torque command.

In a deceleration section in which the vehicle is decelerating because the driver does not depress the accelerator pedal, the total torque command finally determined from the required torque (the sum torque command as the pre-distribution torque command) is determined as a negative (−) torque value to implement the coasting deceleration function.

Furthermore, even in the deceleration section in which the vehicle is decelerating, both the front wheel torque command and the rear wheel torque command are determined as values equal to or greater than the minimum torque threshold value determined as a positive (+) torque value, and while the accelerator pedal is not applied, the front wheel torque command and the rear wheel torque command are finally maintained at the minimum torque threshold value.

At the present time, the braking torque command is determined as a torque value (negative torque) obtained by subtracting the determined front wheel torque command (positive torque) and the determined rear wheel torque command (positive torque) from the total torque command (negative torque), which is the pre-distribution torque command.

Furthermore, in the ON state of the backlash band evasion mode, the front wheel motor torque and front wheel torque command, and the rear wheel motor torque and rear wheel torque command are maintained at torque values equal to or greater than the minimum torque threshold value. Because the backlash band is not passed as illustrated in FIG. 4A during switching from a state in which the accelerator pedal is not applied (released) to a state in which the accelerator pedal is applied (depressed), the front wheel torque command and the rear wheel torque command may be rapidly increased without delay immediately after the accelerator pedal is applied in the state in which the accelerator pedal is not applied.

Referring to FIG. 3, in the state in which the accelerator pedal is not applied, the controller 20 compares the total torque command of step S3 with the sum of the minimum front wheel torque threshold value and the minimum rear wheel torque threshold value (hereinafter referred to as "sum torque threshold value") (step S4), and when the total torque command is less than or equal to the sum torque threshold value, the controller 20 is configured to determine the front wheel torque command and the rear wheel torque command through the front wheel and rear wheel torque distribution process from the total torque command of step S3 in step S10.

At the present time, in the controller 20, each of the front wheel torque command and the rear wheel torque command is adjusted to maintain a value equal to or greater than the minimum torque threshold value (step S11). When the state in which the accelerator pedal is not applied is maintained, each of the front wheel torque command and the rear wheel torque command is determined and maintained as the minimum torque threshold value.

At the same time, in step S11, a value obtained by subtracting the sum of the front wheel torque command (positive torque) and the rear wheel torque command (positive torque) from the total torque command (negative torque) of step S3, which is the pre-distribution torque command, is determined as the braking torque command (negative torque).

Subsequently, the controller 20 is configured to control the operations of the front wheel motor 31 and the rear wheel motor 41 according to the finally determined front wheel torque command and the finally determined rear wheel torque command, and accordingly, positive (+) torque corresponding to the minimum torque threshold value may be output from each of the front wheel motor 31 and the rear wheel motor 41 (step S12).

Furthermore, the controller 20 is configured to control the operation of the friction braking device 50 according to the braking torque command, and thus the friction braking device 50 applies friction braking torque to the wheels to implement the coasting deceleration function (Step S12).

Thereafter, when the driver depresses the accelerator pedal again, because the front wheel torque and the rear wheel torque have previously been maintaining positive (+) values, the front wheel torque and the rear wheel torque do not pass through the backlash band, which is a torque range in which backlash may occur.

Furthermore, because directions of the front wheel torque and the rear wheel torque are not reversed, problems caused by backlash do not occur. Furthermore, as illustrated in FIG. 4B, the vehicle may be accelerated immediately after the driver depresses the accelerator pedal, and thus acceleration/deceleration responsiveness of the vehicle may be improved.

When the total torque command of step S3 is greater than the sum torque threshold value in step S4, the total torque command is distributed to the front wheel torque command and the rear wheel torque command through the front wheel and rear wheel torque distribution process without generating a braking torque command in step S5. Subsequently, the operations of the front wheel motor 31 and the rear wheel motor 32 are controlled according to the distributed front wheel torque command and rear wheel torque command (Step S9).

Figure 5:
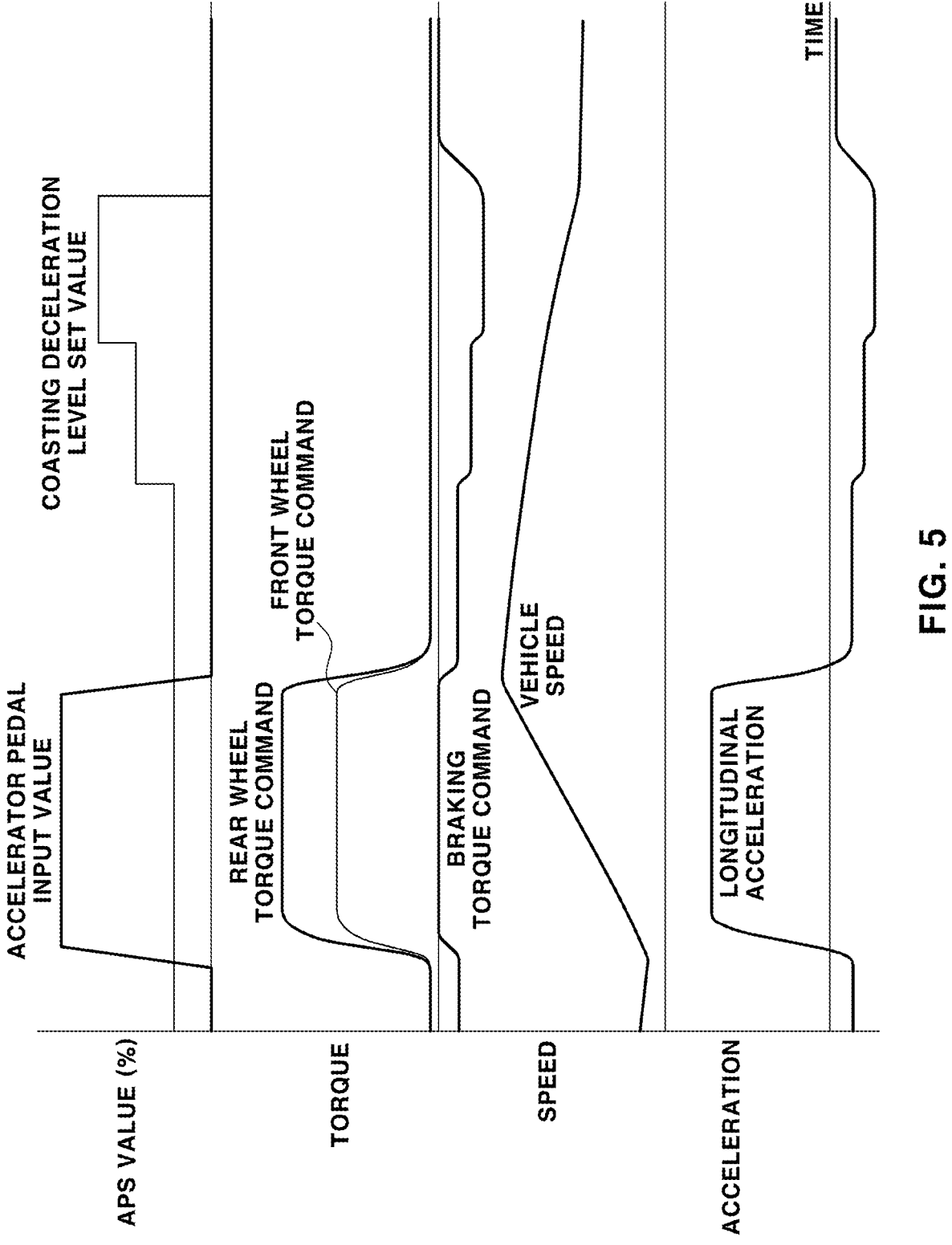
FIG. 5 is a diagram for describing a friction braking cooperative control method according to a change in coasting deceleration level in an exemplary embodiment of the present disclosure.

Meanwhile, FIG. 5 is a diagram for describing a friction braking cooperative control method according to a change in coasting deceleration level in various exemplary embodiments of the present disclosure, and FIG. 6 is a diagram illustrating another example of the front wheel and rear wheel torque distribution state in an exemplary embodiment of the present disclosure.

Figure 7:
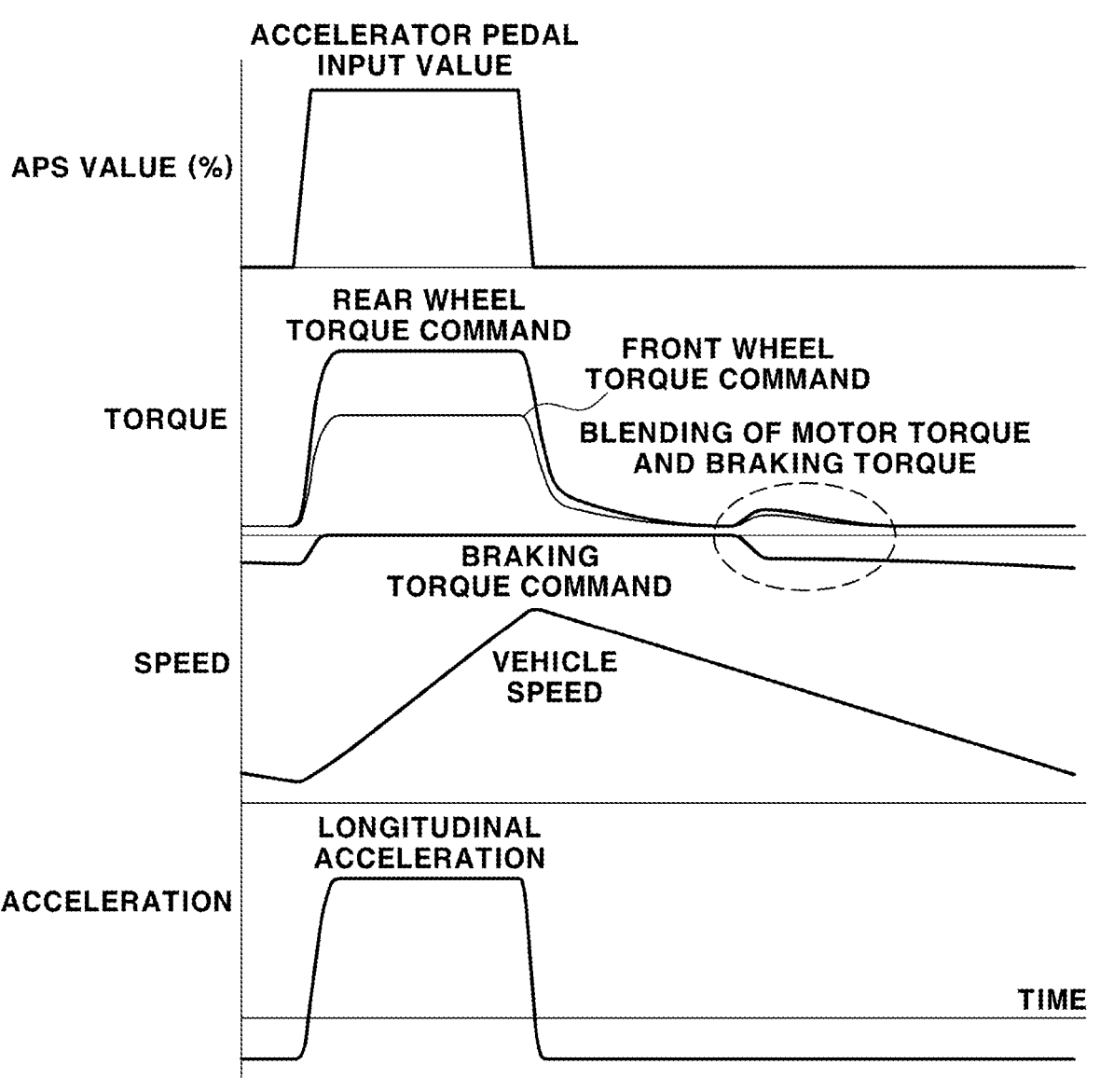
FIG. 7 is a diagram illustrating the front wheel and rear wheel torque distribution state in an exemplary embodiment of the present disclosure, and illustrating an example in which coasting deceleration profiling is performed.

Furthermore, FIG. 7 is a diagram illustrating the front wheel and rear wheel torque distribution state in an exemplary embodiment of the present disclosure, and illustrating an example in which coasting deceleration profiling is performed. The state of FIG. 6 is a state in which coasting deceleration profiling is not performed when compared to the state of FIG. 7.

In an exemplary embodiment of the present disclosure, as described above, when the control method of maintaining the front wheel motor torque and the rear wheel motor torque at positive (+) torque values at all times is applied, regenerative braking by the motor becomes impossible. Thus, a coasting deceleration function cannot be implemented, and there is a problem such as a decrease in driving efficiency due to inability to perform regenerative braking.

Therefore, in an exemplary embodiment of the present disclosure, the following method may be applied as a countermeasure to the above problem.

First, the problem of non-implementation of the coasting deceleration function may be solved through cooperative friction braking control using the friction braking device 50. When the driver releases the accelerator pedal, if the vehicle is not in a creep state, the required torque is determined as a negative (−) value to implement the coasting deceleration function.

At the present time, because the motor operating only in a torque range greater than or equal to the set threshold value cannot implement negative (−) required torque, the present disclosure utilizes the friction braking device 50 to satisfy the negative (−) required torque.

In an exemplary embodiment of the present disclosure, the friction braking torque command for implementing regenerative torque, which is the negative (−) required torque, by use of the friction braking device 50 during backlash band evasion control may be determined as a difference between the total torque command (sum torque command) and a front and rear wheel sum torque command.

Here, the front and rear wheel sum torque command is a command obtained by summing the front wheel torque command and the rear wheel torque command, and during backlash band evasion control, the front wheel torque command and the rear wheel torque command are determined as positive (+) torque values greater than or equal to the minimum torque threshold value as described above.

Furthermore, in various exemplary embodiments of the present disclosure, when regenerative braking is performed by the motor in a state in which the driver does not operate the accelerator pedal and the accelerator pedal is not applied (released) in the vehicle in which regenerative braking is performed, the required torque and the total torque command (pre-distribution torque command) may vary according to driver settings.

For example, when the driver selects a coasting deceleration level through the interface 12, the total torque command may be determined as a set value corresponding to the coasting deceleration level selected by the driver (see "when the accelerator pedal is not applied" of FIG. 5).

Referring to the example of FIG. 5, it may be seen that, when the accelerator pedal is not applied, weaker regenerative braking is performed at the same vehicle speed as the coasting deceleration level is lower. When the accelerator pedal is not applied, as the coasting deceleration level is lower, the regenerative torque value (negative value), which is the required torque, and total torque command are determined as smaller values based on absolute values at the same vehicle speed.

In an exemplary embodiment of the present disclosure, when the magnitudes of the required torque and the total torque command differentiated according to the coasting deceleration level are determined as negative (−) values, the friction braking device 50 and friction braking torque generated by the friction braking device 50 are used to follow the magnitudes of the required torque and the total torque command determined as the negative (−) values.

Furthermore, the required torque at the time of canceling setting of the coasting deceleration level may be set to zero in the controller 20. Accordingly, if setting of the coasting deceleration level is canceled, even when the driver releases the accelerator pedal by releasing the accelerator pedal, the required torque may be determined as 0 torque rather than a negative (−) value.

Next, to address a problem of vehicle driving efficiency deterioration, whether or not the backlash band evasion control is applied may be distinguished for each condition. That is, execution and cancellation conditions of the backlash band evasion control are set in advance in the controller 20.

For example, the execution condition of the backlash band evasion control may include a condition in which the driver turns on the backlash band evasion mode through the interface 12, and the cancellation condition of the backlash band evasion control may include a condition in which the driver turns off the backlash band evasion mode through the interface 12.

Furthermore, the execution condition of the backlash band evasion control may include a condition in which a predetermined vehicle driving state or a driving mode is obtained, and the cancellation condition of the backlash band evasion control may include a condition in which the predetermined vehicle driving state or the driving mode is canceled.

In the present way, upon determining that the controller 20 reaches the predetermined vehicle driving state or enters the predetermined driving mode, the backlash band evasion control may be performed. In general, because acceleration/deceleration responsiveness needs to be improved under a performance-requiring driving condition, execution and cancellation of the backlash band evasion control may be determined in conjunction with entry and cancellation of a driving performance-priority driving mode such as a sports mode or a performance mode.

Furthermore, at least one of a track mode, a cornering mode, or a drift mode may be determined as a driving mode in which the backlash band evasion control may be executed.

The controller 20 may be set to determine that the vehicle enters a track based on track information including stored track location information and track route information, and real-time vehicle location information obtained from a GPS signal, etc. received through the GPS receiver 13 in the vehicle, and then execute the backlash band evasion control in a turning section of the track during the track mode in which the vehicle travels along the track.

Furthermore, the controller 20 may be set to determine that the driving mode of the vehicle is the cornering mode in which the vehicle travels in the turning section based on vehicle driving information obtained by the sensor 11, and then execute the backlash band evasion control during the cornering mode.

At the present time, when at least one of vehicle lateral acceleration, a vehicle yaw rate, or a steering angle as the vehicle driving information exceeds each preset threshold value, the controller may be configured to determine that the driving mode of the vehicle is the cornering mode, and execute the backlash band evasion control.

Furthermore, the controller 20 may be set to execute the backlash band evasion control upon determining that the vehicle enters the drift mode according to a driving operation of the driver. The drift mode is a mode in which slip is artificially generated in the rear wheels by mainly applying torque to the rear wheels of the vehicle.

In the drift mode, precise and high acceleration/deceleration responsiveness and accuracy are required to maintain an appropriate amount of slip after start of occurrence of rear wheel slip, and the backlash band evasion control may be executed in conjunction with the drift mode.

In a situation other than these driving modes, to ensure driving efficiency through efficient regenerative braking, active regenerative braking needs to be performed even at the risk of using and operating motor torque in the backlash band.

Meanwhile, in an exemplary embodiment of the present disclosure, the minimum torque threshold value may be applied to the distributed front wheel torque command and rear wheel torque command, and an important purpose of setting and applying the minimum torque threshold value is to prevent backlash.

As described above, in an exemplary embodiment of the present disclosure, the front wheel motor 31 and the rear wheel motor 41 are controlled so that sufficient torque is applied to the drive system so that gear elements are aligned in a positive (+) torque transmission direction at all times in both a driving situation and a coasting situation.

To the present end, in the controller 20, the front wheel torque command, which is a torque command for the front wheel motors 31, and the rear wheel torque command, which is a torque command for the rear wheel motor 41, are set to values greater than or equal to the minimum torque threshold value determined as a positive (+) torque value all the time.

However, as the minimum torque threshold value increases, alignment of the gears is ensured, and thus entry into the backlash band may be prevented. However, when the minimum torque threshold value is set to excessively high torque, battery energy may be excessively consumed.

Furthermore, even when there is no acceleration request, the front wheel torque command and the rear wheel torque command are maintained at values greater than or equal to the minimum torque threshold value. At the instant time, because unnecessary torque generated by the motor needs to be offset using braking force, when the minimum torque threshold value is set to be excessively high, efficiency of the drive system may be degraded.

In an exemplary embodiment of the present disclosure, a value determined according to a vehicle driving state such as the vehicle speed or the drive system oil temperature measured by the sensor 11 may be used as the minimum torque threshold value.

Furthermore, the present disclosure includes a coasting deceleration profiling process for determining the front wheel torque command, the rear wheel torque command, and the braking torque command during coasting deceleration.

After tip-out in which the driver releases a foot from the accelerator pedal, air frictional force applied to the vehicle decreases as the vehicle coasts and decelerates. If this is not considered, different deceleration may occur depending on the vehicle speed even in the same accelerator pedal release situation.

Therefore, constant coasting deceleration of the vehicle may be implemented by varying the required torque and the total torque command according to the vehicle speed. Therefore, when torque control according to an exemplary embodiment of the present disclosure is applied, a method for following the changing required torque and total torque command as described above needs to be prepared.

When the vehicle speed is sufficiently higher than the set vehicle speed, vehicle deceleration due to aerodynamic force sufficiently occurs, and thus the total torque command may include a positive (+) torque value to compensate therefor.

At the present time, cooperative control of the friction braking torque for following the required torque and the total torque command is not performed, and the total torque command may be followed using the motor. However, this is a case where the total torque command is greater than the sum of the minimum front wheel torque threshold value and the minimum rear wheel torque threshold value.

When the total torque command is lower than the sum torque threshold value, which is the sum of the minimum front wheel torque threshold value and the minimum rear wheel torque threshold value, or decreases to a negative (−) torque value, the front and rear motor torque cannot be operated at the minimum torque threshold value or less, and thus cooperative control of friction braking torque is used to follow the required torque and the total torque command. At the instant time, the front wheel motor torque and the front wheel torque command, and the rear wheel motor torque and the rear wheel torque command are allowed to maintain values equal to or greater than the minimum torque threshold values, respectively.

However, when the total torque command becomes lower than the sum torque threshold value or decreases to a negative (−) torque value, and thus friction braking torque needs to be applied, due to the transient nature of the friction braking device 50, it is difficult to ensure accurate torque command following performance of the friction braking device due to disturbances such as temperature and humidity, which may deteriorate drivability.

Therefore, as coasting deceleration progresses, the torque of each of the front wheel motor 31 and the rear wheel motor 41 is maintained at the minimum torque threshold value, and rather than controlling coasting deceleration using only an increase in friction braking torque, it is possible to apply a method of forming a blending section between the motor torque and the braking torque so that disturbance of the friction braking torque may be compensated for in a region where the motor torque is greater than or equal to the minimum torque threshold value (see FIG. 7).

As a method for compensating for disturbance of the friction braking torque, in the exemplary embodiment of FIG. 7, the controller 20 is configured to determine the total torque command and the required torque for linearly changing the vehicle speed after the driver tips-out the accelerator pedal.

Furthermore, when the total torque command is less than or equal to the sum torque threshold value in a state in which time has elapsed after the controller 20 tips-out the accelerator pedal, the front wheel torque command and the rear wheel torque command are determined as the minimum front wheel torque threshold value and the minimum rear wheel torque threshold value, respectively, and a braking torque command is generated. Here, based on the magnitude of the absolute value, the braking torque command increased to a set torque value or more is generated.

The braking torque command is increased to the set torque value or more to compensate for disturbance of the friction braking torque. When the braking torque command is increased to the set torque value or more, the front wheel torque command and the rear wheel torque command are temporarily determined as values greater than or equal to the minimum torque threshold value so that the sum of the increasing braking torque command may satisfy the total torque command.

In the present way, the exemplary embodiment of the present disclosure has been described in detail. The ON state of the backlash band evasion mode is a state in which the backlash band evasion mode and the backlash band evasion control are executed, and the OFF state of the backlash band evasion mode is a state in which the mode is cancelled so that the backlash band evasion mode and the backlash band evasion control are not executed.

In an exemplary embodiment of the present disclosure, the backlash band evasion mode may include at least one of a mode in which the backlash band evasion control is automatically executed and cancelled based on the required load capacity of the vehicle, or a mode in which the backlash band evasion control is automatically executed and cancelled based on the driving mode of the vehicle. Here, the driving mode may include the track mode, the cornering mode, the responsiveness priority mode, and the drift mode as described above.

According to an exemplary embodiment of the present disclosure described above, the backlash band evasion control of the drive system is executed, and motor control specialized for the high-performance driving mode is performed, so that occurrence of backlash itself may be prevented. Because the motor is used only in a torque range irrelevant to backlash, backlash vibration and noise impact problems may be effectively solved.

Furthermore, because driving force may be generated without concern about backlash problems, longitudinal responsiveness of the vehicle may be greatly improved. A driving mode emphasizing direct connection for high-performance electric vehicles may be provided, convenience and accuracy of load movement control when turning on a track may be improved, and ease of use of a special driving mode such as a drift mode may be improved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling torque of a drive system of an electric vehicle, the method comprising:
   determining, by a controller, a required torque according to a vehicle driving state while the vehicle is driven, and determining, by the controller, a total torque command based on the determined required torque; and
performing, by the controller, a front wheel and rear wheel torque distribution process on the total torque command, so that a front wheel torque command for controlling an operation of a front wheel motor and a rear wheel torque command for controlling an operation of a rear wheel motor are determined,
wherein, during coasting deceleration driving of the vehicle,
the total torque command is determined as a negative (−) torque value for decelerating the vehicle,
each of the front wheel torque command and the rear wheel torque command is determined as a value greater than or equal to a minimum torque threshold value determined as a positive (+) torque value; and
a braking torque command for a friction braking device is generated by the controller so that the vehicle decelerates, and a friction braking torque by the friction braking device is applied to wheels of the vehicle, and
wherein the braking torque command is determined as a negative (−) torque value obtained by subtracting a sum of the front wheel torque command and the rear wheel torque command from the total torque command.

2. The method of claim 1, wherein the minimum torque threshold value includes:
   a minimum front wheel torque threshold value, which is a minimum torque threshold value for the front wheel torque command; and
   a minimum rear wheel torque threshold value, which is a minimum torque threshold value for the rear wheel torque command.

3. The method of claim 2, wherein the controller is configured for:
   comparing the total torque command with a sum torque threshold value obtained by summing the minimum front wheel torque threshold value and the minimum rear wheel torque threshold value; and
   determining the front wheel torque command as the minimum front wheel torque threshold value, and determining the rear wheel torque command as the minimum rear wheel torque threshold value when the controller concludes that the total torque command is less than or equal to the sum torque threshold value.

4. The method of claim 2, wherein, during the coasting deceleration driving of the vehicle, the controller is configured to determine the total torque command as a set value corresponding to a coasting deceleration level selected by a driver.

5. The method of claim 4, wherein the set value corresponding to the coasting deceleration level is set as a different regenerative torque value according to the coasting deceleration level under a same vehicle speed condition.

6. The method of claim 4, wherein, in a response that cancellation of coasting deceleration level setting is selected by the driver, the controller is configured to determine the total torque command as a 0 torque value.

7. The method of claim 2, wherein the minimum front wheel torque threshold value and the minimum rear wheel torque threshold value are values determined according to the vehicle driving state.

8. The method of claim 7, wherein the vehicle driving state is a vehicle speed or a drive system oil temperature detected by a sensor.

9. The method of claim 2, wherein after accelerator pedal tip-out, the controller is configured for:

determining the total torque command that causes a vehicle speed to linearly change;

comparing the total torque command with a sum torque threshold value obtained by summing the minimum front wheel torque threshold value and the minimum rear wheel torque threshold value, and determining the front wheel torque command and the rear wheel torque command as the minimum front wheel torque threshold value and the minimum rear wheel torque threshold value when the total torque command is less than or equal to the sum torque threshold value; and for a predetermined time period, determining the front wheel torque command and the rear wheel torque command as values equal to or greater than respective minimum torque threshold values thereafter so that a braking torque command is increased to be greater than or equal to a set torque value based on a magnitude of an absolute value, and a sum of the increased braking torque command satisfies the total torque command.

10. The method of claim 2, wherein the controller is configured for:

comparing the total torque command with a sum torque threshold value obtained by summing the minimum front wheel torque threshold value and the minimum rear wheel torque threshold value; and determining the front wheel torque command and the rear wheel torque command so that a torque value obtained by summing the front wheel torque command and the rear wheel torque command satisfies a torque value of the total torque command without generating the braking torque command when the total torque command is greater than or equal to the sum torque threshold value.

11. The method of claim 1, wherein the minimum torque threshold value is a value determined according to the vehicle driving state.

12. The method of claim 11, wherein the vehicle driving state is a vehicle speed or a drive system oil temperature detected by a sensor.

13. The method of claim 1, wherein the minimum torque threshold value is determined as a value greater than or equal to an upper limit threshold value of a backlash band, which is a torque region where there is a possibility that backlash occurs.

14. The method of claim 1, wherein, in a response that an ON state of a backlash band evasion mode is selected and input by a driver, the controller is configured to perform backlash band evasion control to determine the front wheel torque command and the rear wheel torque command as a value equal to or greater than the minimum torque threshold value, and to generate the braking torque command so that the friction braking torque is applied to the wheels during the coasting deceleration driving of the vehicle.

15. The method of claim 1, wherein, upon determining that a predetermined vehicle driving state is reached or a predetermined driving mode is entered, the controller is configured to perform backlash band evasion control to determine the front wheel torque command and the rear wheel torque command as a value equal to or greater than the minimum torque threshold value, and to generate the braking torque command so that the friction braking torque is applied to the wheels during the coasting deceleration driving of the vehicle.

16. The method of claim 15, wherein the predetermined driving mode includes at least one of a track mode, a cornering mode, or a drift mode.

17. The method of claim 16, wherein the controller is configured to determine that the vehicle enters a track based on track information and real-time vehicle location information, and to execute the backlash band evasion control in a turning section of the track during the track mode in which the vehicle travels along the track.

18. The method of claim 16, wherein the controller is configured to determine that the driving mode of the vehicle is the cornering mode in which the vehicle travels in a turning section based on vehicle driving information obtained by a sensor, and then to execute the backlash band evasion control during the cornering mode.

\* \* \* \* \*